(12) United States Patent
Chien

(10) Patent No.: US 8,009,148 B2
(45) Date of Patent: Aug. 30, 2011

(54) ADAPTIVE NON-CONTACT TESTING METHOD FOR TOUCH PANEL

(75) Inventor: Shun-Ta Chien, Dayuan Township, Taoyuan County (TW)

(73) Assignee: TPK Touch Solutions Inc., Taipei (TW)

( * ) Notice: Subject to any disclaimer, the term of this patent is extended or adjusted under 35 U.S.C. 154(b) by 875 days.

(21) Appl. No.: 12/003,084

(22) Filed: Dec. 20, 2007

(65) Prior Publication Data

US 2009/0160788 A1     Jun. 25, 2009

(51) Int. Cl.
*G06F 3/041* (2006.01)
(52) U.S. Cl. ....................................... 345/173
(58) Field of Classification Search ........... 345/173–178
See application file for complete search history.

(56) References Cited

U.S. PATENT DOCUMENTS

| | | | |
|---|---|---|---|
| 3,768,622 A * | 10/1973 | Wood | 400/177 |
| 6,590,568 B1 | 7/2003 | Astala et al. | |
| 6,675,637 B2 | 1/2004 | Saito | |
| 6,943,778 B1 | 9/2005 | Astala et al. | |
| 6,956,563 B2 * | 10/2005 | Yamashita | 345/173 |
| 7,248,249 B2 | 7/2007 | Kong et al. | |

FOREIGN PATENT DOCUMENTS

| | | |
|---|---|---|
| CN | 1257241 | 6/2000 |
| CN | 1133114 | 12/2003 |
| CN | 1203408 | 5/2005 |
| EP | 0372812 A2 | 6/1990 |
| TW | I238970 | 9/2005 |

OTHER PUBLICATIONS

A communication from the Chinese patent office in a counterpart foreign application dated Feb. 12, 2010.

* cited by examiner

*Primary Examiner* — Kevin M Nguyen
*Assistant Examiner* — Kenneth B Lee, Jr.
(74) *Attorney, Agent, or Firm* — Gokalp Bayramoglu; Anna Tsang

(57) ABSTRACT

An adaptive non-contact testing method is provided for testing a touch panel, wherein an air nozzle generates an air jet toward a selected position on a touch panel under testing to cause the touch panel to generate a touch signal. A testing system receives the touch signal generated by the touch panel and compares the received touch signal with a preset touch-signal reference level. When the received touch signal is smaller than the preset touch-signal reference level, the height distance between the air nozzle and the touch panel is reduced or the pressure of the air jet from the air nozzle is varied to realize adaptive testing of the touch panel.

8 Claims, 11 Drawing Sheets

ADAPTIVE NON-CONTACT TESTING METHOD FOR TOUCH PANEL

FIELD OF THE INVENTION

The present invention relates to the field of testing of touch panels, and in particular to an adaptive non-contact testing method for touch panels.

BACKGROUND OF THE INVENTION

Touch panels are now widely employed in for example a display of a portable computer, input means of a portable personal communication device, various household electrical appliances, public information systems, and office automation devices.

FIG. 1 of the attached drawings shows an exploded view of a conventional touch panel. The conventional touch panel, which is generally designated at 100 in FIG. 1, comprises a glass substrate 11 having a surface on which a transparent conductor layer 111, such as an ITO layer, is coated so that the glass substrate 11 and the transparent conductor layer 111 form an electrically conductive glass panel. The electrically conductive glass panel is covered with a film 12, which has a bottom surface coated with a transparent conductor layer 121 opposing the transparent conductor layer 111 of the glass substrate 11. A plurality of insulation spacer nodes 13 is arranged between the transparent conductor layer 111 of the glass substrate 11 and the transparent conductor layer 121 of the film 12 to separate the transparent conductor 111 from the transparent conductor layer 121. Often, a protection layer 14 is provided to cover a top face of the film 12.

The transparent conductor layer 111 of the glass substrate 11 and the transparent conductor layer 121 of the film 12 are respectively provided with signal contacts 112, 122 to which a signal transmission cable 15 is connected to send out signals generated due to depression or actuation of the touch panel 100.

In the manufacturing of the touch panel 100, a conventional manufacturing process comprises etch-resistant printing applied to a glass substrate, etching and film peeling, printing of insulation spacer nodes, printing of sliver lines, printing of insulation layer, and printing of frame to complete the manufacturing of an electrically conductive glass panel. The manufacturing of the conductor film is substantially similar. The electrically conductive glass panel and the conductor film so manufactured are then stacked together, and thereafter subjected to trimming and connection with a flat cable to complete the manufacturing of the touch panel.

After the touch panel has been so manufactured, a linearity testing is taken to inspect if the touch panel meets the required electrical performance and satisfies the desired quality. The linearity testing is a major testing for electrical characteristics.

In the conventional method for carrying linearity testing, as shown in FIG. 2, a practical touch/depression is carried out for the testing, wherein a pressurizing testing stylus 2 is positioned on the touch panel 100 to actually touch and depress the surface of the touch panel 100. As to the connection of signal, the signal transmission cable 15 is connected to a testing system 3 in which programs for reading and analyzing signals are pre-loaded so that the testing system 3 reads signals from the touch panel 100 through the signal transmission cable 15 and further analyzes the signals so read for displaying on a display 4 connected to the testing system 3. To carry out the testing, the pressurizing testing stylus 2 touches and depresses the touch panel 100 along a predetermined testing route L defined in directions of X-axis and Y-axis to apply pressure to, draw lines on, and make displacement on the touch panel 100, whereby due to the pressurization of the touch panel 100, the transparent conductor layer 111 of the glass substrate 11 and the transparent conductor layer 121 of the film 12 of the touch panel 100 are forced to get into contact with each other, inducing a signal of touch. The signal of touch is then transmitted through the signal transmission cable 15 to the testing system 3 and is subsequently read and analyzed by the testing system 3, and a testing route L' corresponding to the signals read is displayed on the display 4 of the testing system 3. Based on the result displayed, a determination can be made if the touch panel is qualified for the linearity testing.

In such a conventional manner of testing, where a pressurizing testing stylus is used to carry out the testing of a touch panel, direct contact and pressurization are applied to the surface of the touch panel to carry out the testing so that the pressurizing testing stylus itself becomes a major factor of testing for the touch panel. For example, the contact pressurization applied by the pressurizing testing stylus and line-drawing and displacement of the pressurizing testing stylus must be controlled by a specific jig or controller. Poor design of the jig or controller and irregularity on a contact point of the pressurizing testing stylus or the surface of the touch panel all are potential causes for damage and/or scrape of the surface of the touch panel. Even a tiny scrape or damage may make the touch panel an unacceptable product by the consumers when the touch panel product is put into market. In addition, in case that tiny contamination particles attach on the surface of the touch panel at the time the testing is carried out, the pressurizing testing stylus, when displacing on the surface of the touch panel, may be stuck by the particles, may apply a pressure to the surface of the touch panel through the particles that exist between the pressurizing testing stylus and the surface of the touch panel, again causing undesired damage on the surface of the touch panel.

Further, in addition that the touch panel product has to meet the requirement of linearity testing, the touch panel is also tested to make sure that it has acceptable electrical characteristics. For example, the relationship between the contact pressure applied to the touch panel and the touch signal generated by the touch panel is considered a major indication for satisfaction of quality requirement of the touch panel. However, heretofore, inspection and testing of a touch panel product are only carried out for the linearity testing and no testing to the electrical performance has been done and suggested.

Thus, the present invention is aimed to overcome such a drawback occurring in the conventional testing of a touch panel that is carried by a pressurization testing stylus in order to ensure the quality of touch panels and to examine electrical performance of the touch panel products.

SUMMARY OF THE INVENTION

Thus, an objective of the present invention is to provide an adaptive testing method for a touch panel, wherein an adaptive condition test is carried out for testing the touch panel.

Another objective of the present invention is to use a regulable air jet to carry out non-contact testing of a touch panel, wherein the regulable air jet is varied to provides different testing conditions to the touch panel and, as a result, the touch panel generates touch signals corresponding to the testing conditions so that quality of the touch panel can be identified through the response of the touch signal provided by the touch panel with respect to the variation of the air jet.

To realize the above objectives, in accordance with the present invention, an air nozzle having an air jet orifice is arranged above a surface of a touch panel to be tested with a predetermined height distance set between the air jet orifice and the surface of the touch panel. Air is then supplied to the air nozzle to cause the air jet orifice of the air nozzle to generate an air jet toward the surface of the touch panel, and then the touch panel, subjected to the pressurization of the air jet, generates a touch signal. The touch signal is compared with a preset touch-signal reference level. When the touch signal is smaller than the preset touch-signal reference level, the height distance between the air jet orifice of the air nozzle and the surface of the touch panel is reduced to realize the adaptive testing of the touch panel. Once the testing is completed, the air nozzle is controlled by a control device to move along a predetermined movement route on the surface of the touch panel, and the touch panel generates touch signals corresponding to the movement route of the air nozzle. The control device receives the touch signals based on which to determine if the touch panel under test passes the linearity testing.

In another embodiment, of the present invention, an air jet with variable air pressure replaces the variation of the height distance between the air jet orifice and the surface of the touch panel to similarly realize the adaptive testing of the touch panel.

In accordance with the present invention, a pre-test can be performed on a touch panel to be tested with an adaptive air jet before the linearity testing of the touch panel is carried out. This allows the manufacturers of touch panels to verify if characteristics of a touch panel product satisfy the requirements by referring to the data obtained by applying different factors of pressurization to the touch panel. As to the generation of the adaptive air jet, simple air pressure regulation or variation of height distance between an air jet orifice and the surface of the touch panel under test can both work so that a very simple arrangement and process can be adopted to realize testing of touch panels. Further, in accordance with the present invention, the overall testing process is carried out in a manner that substantially simulates the way the conventional testing generates a touch signal that is performed with a testing stylus physically contacting and moving along a surface of the touch panel, but without actually touching the surface of the touch panel to complete the testing of electrical performance of the touch panel.

BRIEF DESCRIPTION OF THE DRAWINGS

The present invention will be apparent to those skilled in the art by reading the following description of preferred embodiments thereof, as well as the best modes for carrying out the present invention, with reference to the attached drawings, in which.

DETAILED DESCRIPTION OF THE PREFERRED EMBODIMENTS

Figure 1:
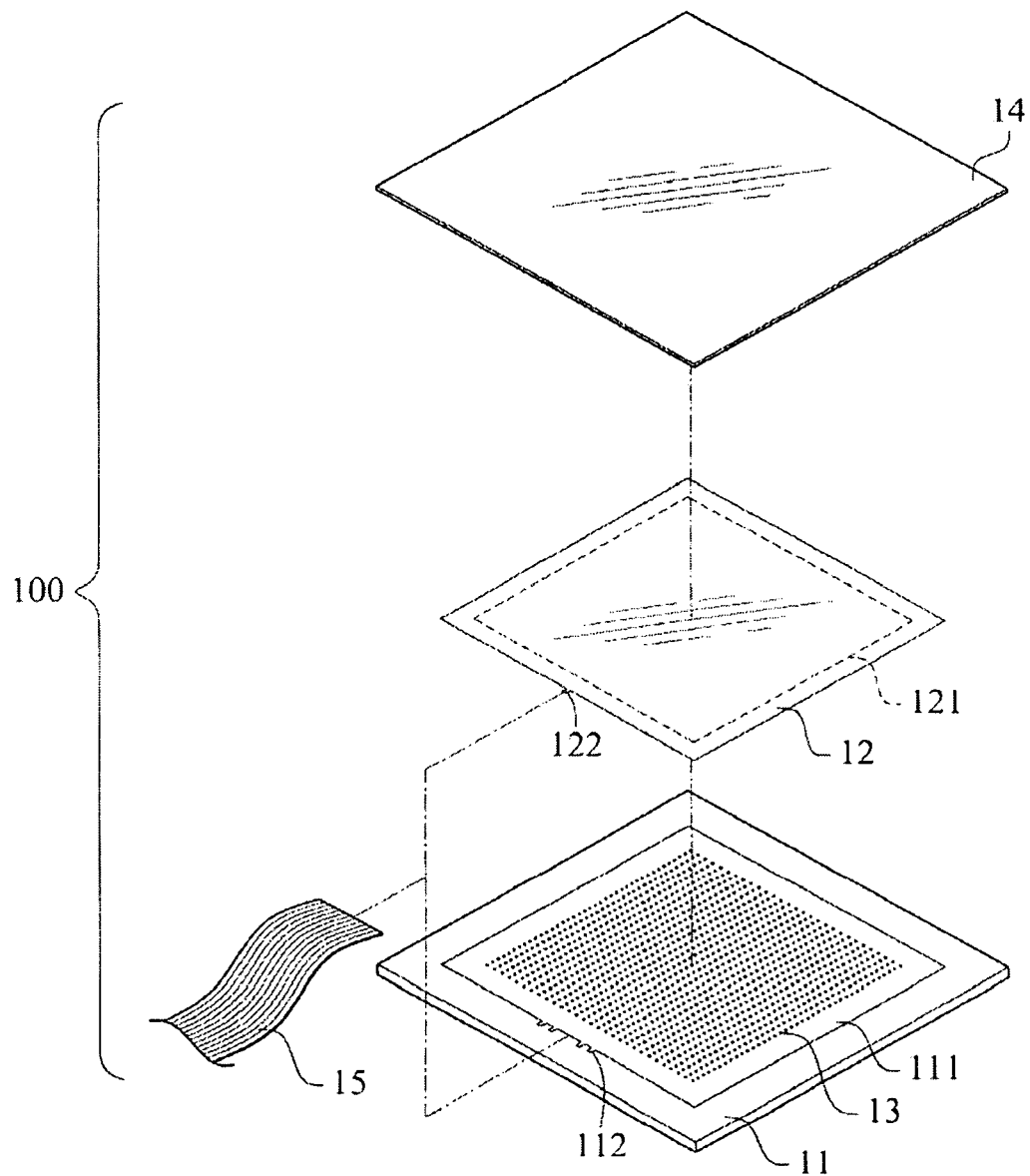
FIG. 1 is an exploded view of a conventional touch panel.
Figure 2:
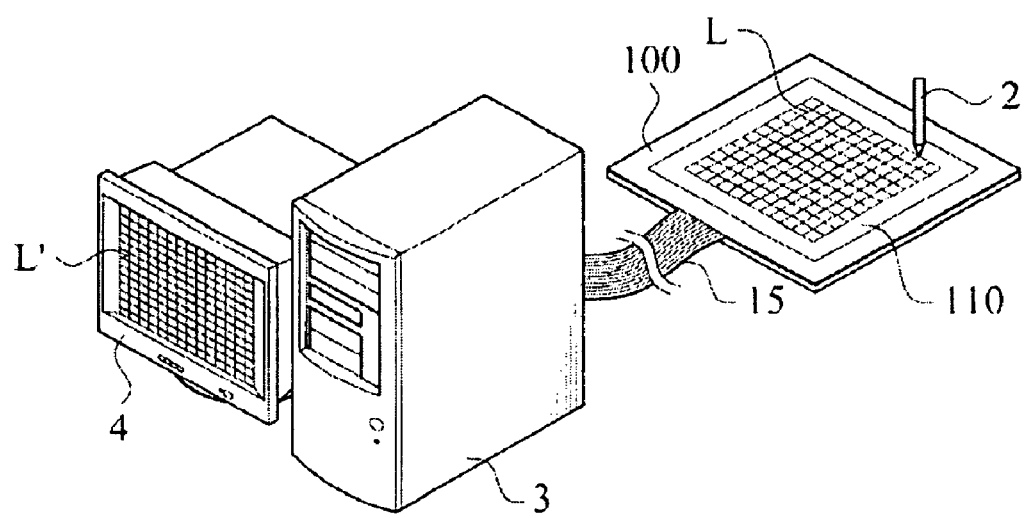
FIG. 2 is a perspective view illustrating an arrangement for carrying out conventional contact testing of a touch panel.
Figure 3:
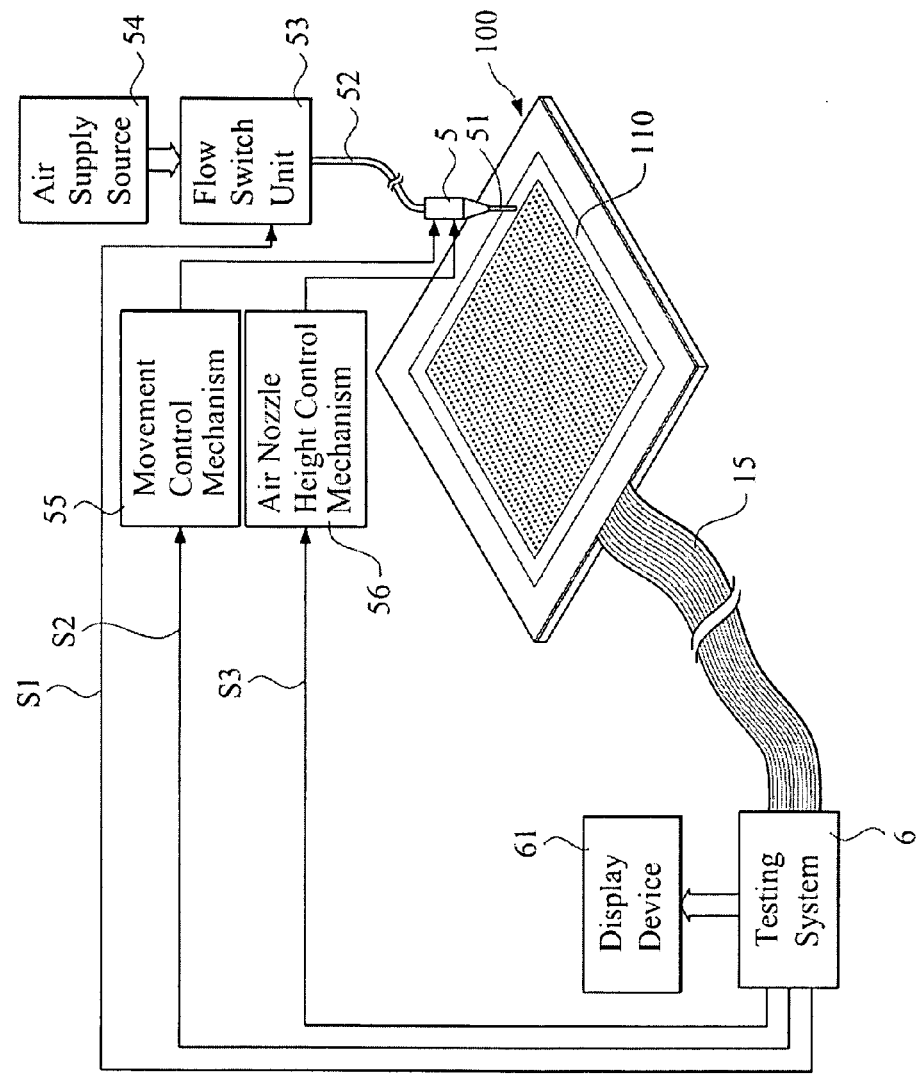
FIG. 3 is a perspective view illustrating an arrangement for carrying out adaptive non-contact testing of a touch panel in accordance with a first embodiment of the present invention.

With reference to the drawings and in particular to FIG. 3, an arrangement for carrying out an adaptive non-contact testing of a touch panel in accordance with a first embodiment of the present invention is illustrated. As shown, in accordance with the present invention, a touch panel, generally designated at 100, which has been previously manufactured and is subjected to testing, is provided. An air nozzle 5 is arranged above the touch panel 100. The air nozzle 5 has a bottom forming an air jet orifice 51 opposing and spaced from a surface of an active zone 110 of the touch panel 100 by a predetermined distance in the vertical or height direction, which will be referred to as height distance.

The air nozzle 5 is connected to an air supply source 54 through a conduit 52 and a flow switch unit 53. The air supply source 54 supplies air of preset pressure through the conduit 52 under the control of the flow switch unit 53 to the air nozzle 5.

The touch panel 100 is set in such a way that a signal transmission line or cable 15 connects the touch panel 100 to a testing system 6. The testing system 6 is preloaded with programs or software for signal reading and analysis. The testing system 6 receives a touch signal from the touch panel 100 through the signal transmission cable 15 and analyzes and processes the touch signal to show data associated with the touch signal on a display device 61 of the testing system 6. The testing system 6 can be for example a computer based facility that is dedicated for testing of touch panels, or alternatively, the testing system 6 can be a regular, general-purpose computer that is pre-loaded with the signal-reading and analysis programs or software and is connectable to the touch panel to be tested.

The testing system 6 provides a flow control signal S1 to control the operation of the flow switch unit 53 in order to selectively conduct/shut down the supply of air from the air supply source 54 to the air nozzle 5. The flow switch unit 53 can be for example an electromagnetic control valve or an equivalent flow control system.

The testing system 6 also provides a movement control signal S2 to control the operation of a movement control mechanism 55 that causes the air nozzle 5 to move along a predetermined route.

The testing system 6 also provides an air nozzle height control signal S3 to control the operation of an air nozzle height control mechanism 56 in order to set the height distance between the air jet orifice 51 of the air nozzle 5 and the surface of the active zone 110 of the touch panel 100 to be tested.

Figure 4:
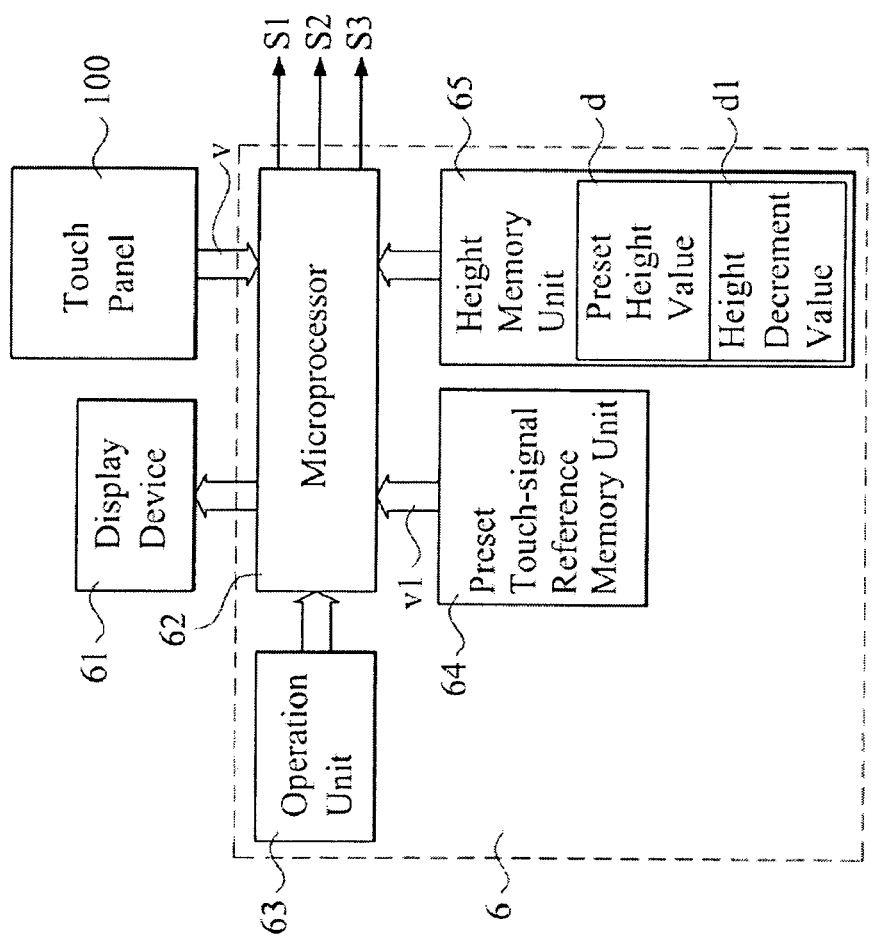
FIG. 4 is a circuit block diagram of a testing system of the arrangement illustrated in FIG. 3.

As shown in FIG. 4, the testing system 6 comprises a microprocessor 62, an operation unit 63, a preset touch-signal reference memory unit 64, and a height memory unit 65. The height memory unit 65 stores a preset height value d and a height decrement value d1.

Figure 5:
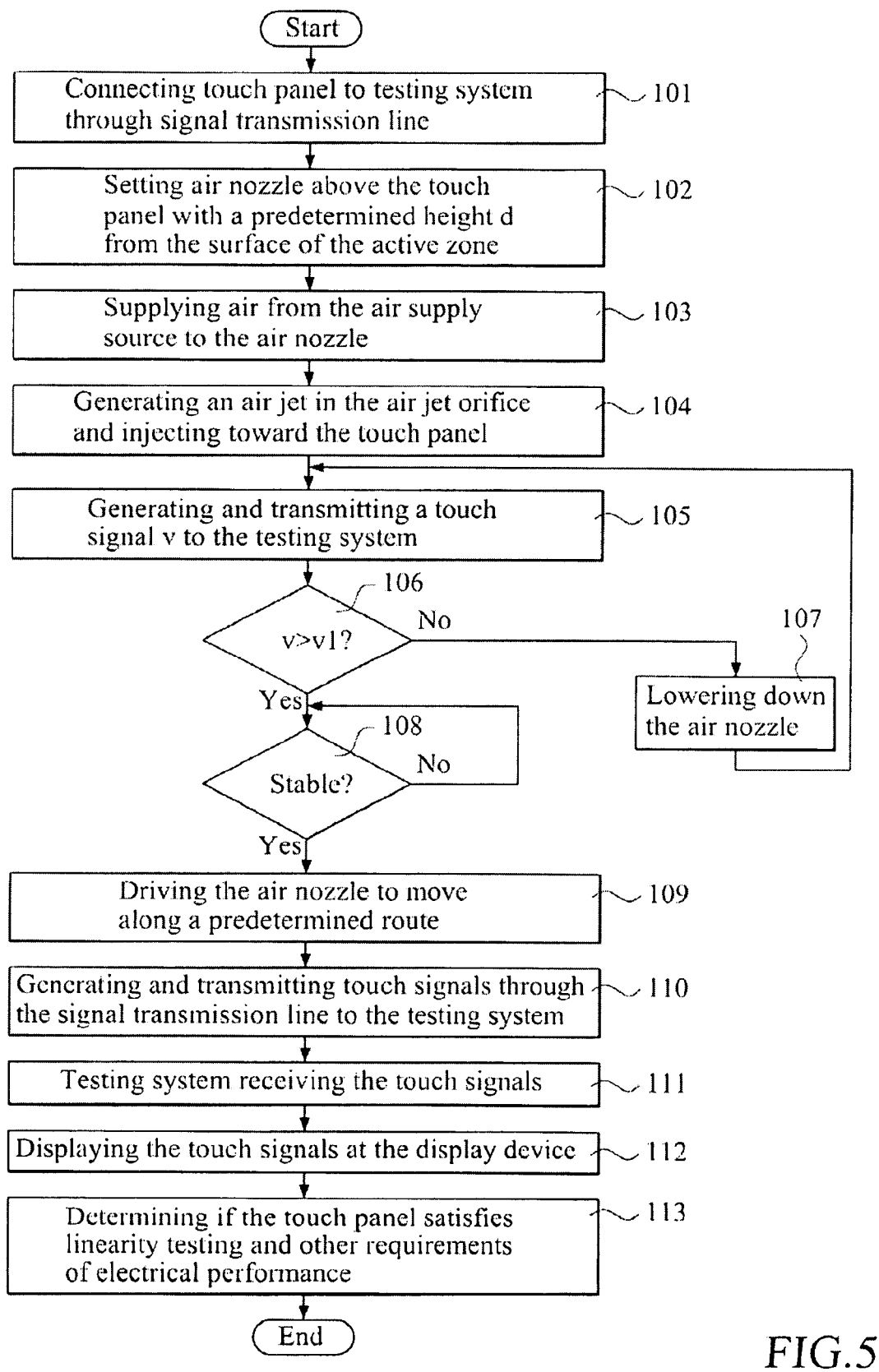
FIG. 5 is a flow chart of the adaptive non-contact testing method in accordance with the first embodiment of the present invention for testing a touch panel.

FIG. 5 shows a flow chart of an adaptive non-contact testing method in accordance with a first embodiment of the present invention for testing a touch panel. The non-contact testing method of the present invention will be described with reference to the flow chart of FIG. 5 and the arrangement of testing illustrated in FIGS. 3 and 4.

The testing starts with connection of a touch panel 100, which is manufactured in advance and is subjected to testing, to the testing system 6 through the signal transmission line 15 (step 101), followed by setting the air nozzle 5 above the touch panel 100 with a predetermined height d between the air jet orifice 51 at the bottom of the air nozzle 5 and the surface of the active zone 110 of the touch panel 100 (step 102).

Figure 6:
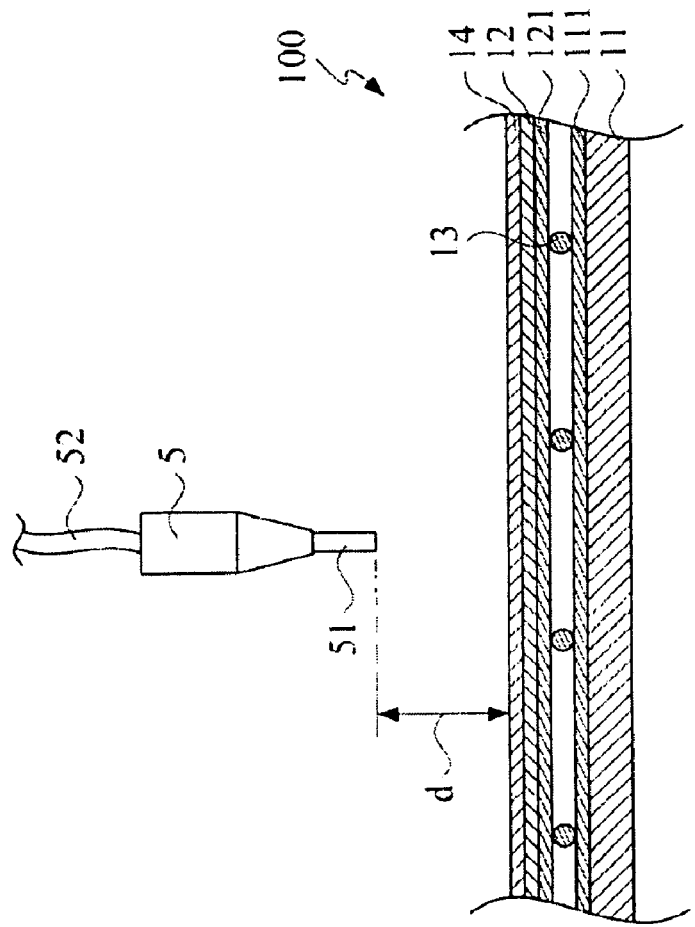
FIG. 6 is a cross-sectional view illustrating that an air nozzle is arranged above a surface of a touch panel with no air jet applied to the surface of the touch panel.

The air nozzle 5, the conduit 52, the flow switch unit 53, the air supply source 54, the movement control mechanism 55, the air nozzle height control mechanism 56, and the testing system 6 are properly connected. FIG. 6 is a cross-sectional view illustrating the air nozzle 5 arranged above the surface of the touch panel 100 in a condition that air jet is not applied to the surface of the touch panel 100.

Figure 7:
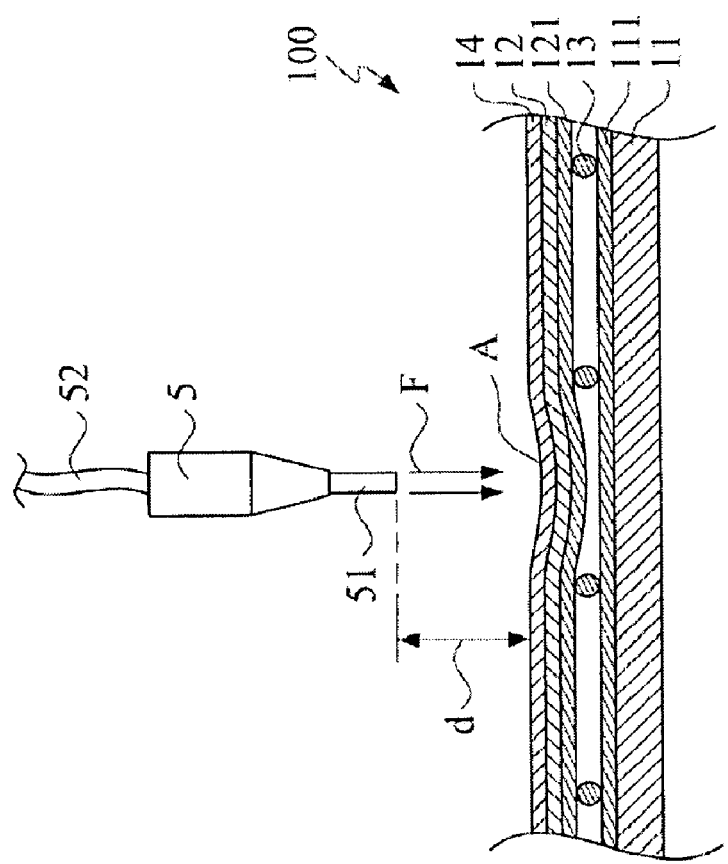
FIG. 7 is a cross-sectional view illustrating that the air nozzle arranged above the surface of the touch panel generates an air jet in an air jet orifice thereof toward the surface of the touch panel.

With the above pre-arrangement completely set, testing of the touch panel 100 can then be performed. Under the control of the testing system 6, air is supplied from the air supply source 54, through the flow switch unit 53 and the conduit 52, to the air nozzle 5 (step 103) and an air jet F is generated in the air jet orifice 51 at the bottom of the air nozzle 5 in a direction toward the touch panel 100 (step 104), as shown in FIG. 7.

In this condition, the surface of the touch panel 100 is subjected to pressurization by the air jet F generated by the air jet orifice 51 that is provided at the bottom of the air nozzle 5 and thus forms a recess A. The touch panel 100 thus generates a touch signal v and the testing system 6 receives the touch signal v (step 105) and compares the received touch signal v with a preset touch-signal reference level v1 (step 106).

When the received touch signal v is larger than the preset touch-signal reference level v1, it indicates that the touch signal v generated by the touch panel 100 is normal and thus, the touch panel may generate a normal touch signal when touched by a user in an actual operation of the touch panel 100.

If it is determined by step 106 that the touch signal v corresponds to zero (0) or is smaller than the preset touch-signal reference level v1, it indicates that the touch signal v generated by the touch panel 100 is not normal. Under this condition, the air nozzle height control mechanism 56 under the control of the testing system 6 lowers down the air nozzle 5 to reduce the height distance between the air jet orifice 51 of the air nozzle 5 and the surface of the active zone 110 of the touch panel 100 (step 107). This is done by step-by-step lowering the air jet orifice 51 of the air nozzle 5 by each time moving a distance equal to the height decrement d1 in a vertical direction toward the touch panel 100, as indicated by arrow II in FIG. 8. Then the process goes back to step 105 and the test is repeated.

After step 107, a step of determining if the air jet orifice 51 of the air nozzle 5 reaches the lowest acceptable height location after each time the height of the air jet orifice 51 of the air nozzle 5 with respect to the touch panel 100 is lowered down may be selectively taken. In case that the air jet orifice 51 of the air nozzle 5 has reached the lowest acceptable height while no acceptable level of touch signal, namely a touch signal that is considered normal, is detected, then the touch panel 100 completely fails the test and is definitely considered abnormal.

Thereafter, to ensure the touch signal v provided by the touch panel 100 can be maintained and lasted for a predetermined time period, a step for determining if the touch signal v is stable (step 108) may then be performed, wherein a predetermined time period is set and when the touch panel 100 maintains the touch signal v for a period exceeding the predetermined time period, it indicates that the touch signal v is a stable signal.

A pre-test is thus completed with the above steps of adaptive testing. In this way, manufacturers of touch panels may verify if characteristics of a touch panel product satisfy the requirements by referring to the data obtained by applying different pressures to the touch panel.

Thereafter, under the control of the testing system 6, the movement control mechanism 55 drives the air nozzle 5 to move along a predetermined route I on the surface of the touch panel 100 (step 109).

Figure 8:
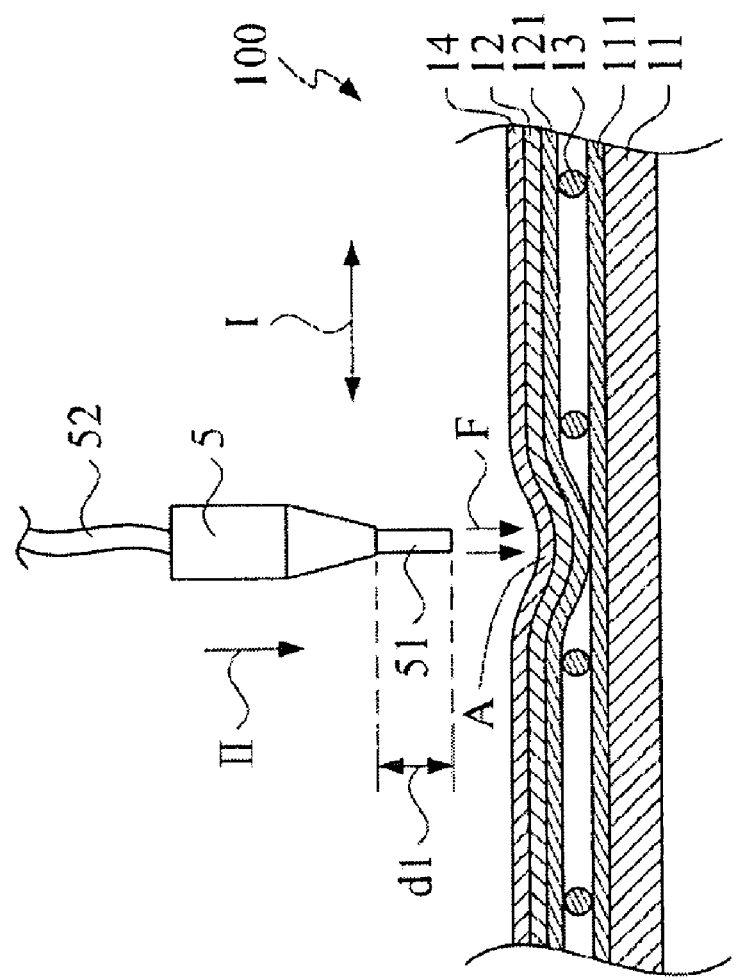
FIG. 8 is a cross-sectional view illustrating that the air nozzle arranged above the surface of the touch panel and generating an air jet in the air jet orifice thereof toward the surface of the touch panel is lowered down with respect to the touch panel.

FIG. 8 is a cross-sectional view illustrating the air nozzle 5 is arranged above the surface of the touch panel 100 and generates an air jet F in the air jet orifice 51 of the air nozzle 5 toward the surface of the touch panel 100. As shown, the surface of the touch panel 100 is subjected to pressurization by the air jet F generated by the air jet orifice 51 at the bottom of the air nozzle 5 to thereby form a recess A, which causes a transparent conductor layer 111 of a glass substrate 11 and a transparent conductor layer 121 of a film 12, both constituting in part the touch panel 100, to contact with each other. As a result, the touch panel 100 generates a series of touch signals corresponding to the touch positions of the air nozzle 5 that moves along the movement route I. The touch signals are applied through the signal transmission line 15 to the testing system 6 (step 110).

The testing system 6 receives the touch signals generated by the touch panel 100 during the movement of the air nozzle 5 along the predetermined route I (step 111) and the display device 61 of the testing system 6 shows the touch signals corresponding to the movement of the air nozzle 5 along the movement route (step 112). Thus, a technician or an operator may base on the touch signals displayed to determine if the touch panel satisfies linearity testing and other requirements of electrical performance (step 113).

In the testing process discussed above, the route I of the air nozzle 5 can be set to be a linear path along a direction of either X-axis or Y-axis of the touch panel 100. Or alternatively, the route I can be set as a transverse path or a curved path. The area of the touch panel 100, which is subjected to the testing, can be for example the whole active zone of the touch panel 100 or can be a local area of the touch panel 100.

Figure 9:
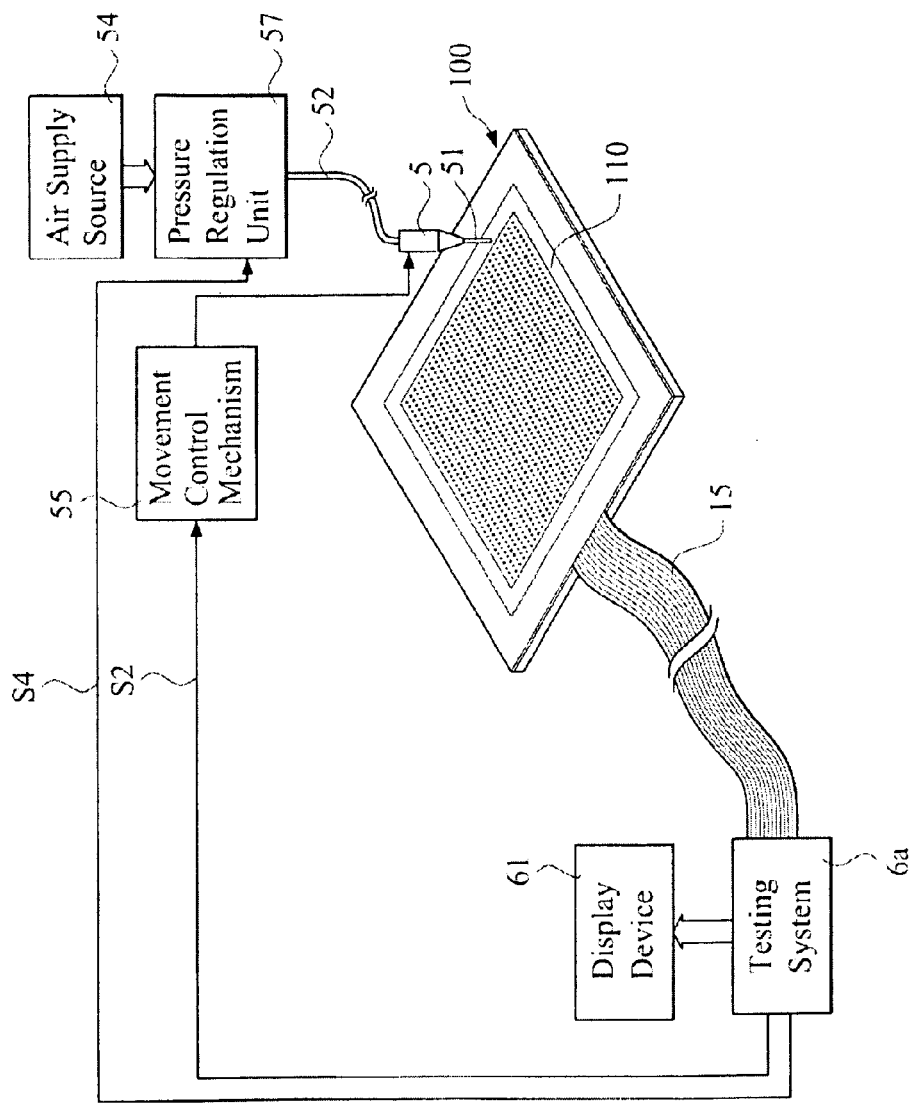
FIG. 9 is a perspective view illustrating an arrangement for carrying out adaptive non-contact testing of a touch panel in accordance with second embodiment of the present invention.

In the previously discussed embodiment, an adaptive air flow is generated by controlling and varying the height location of the air nozzle 5 with respect to the touch panel under testing. However, such an adaptive air flow can be obtained with other means, such as an adjustable air nozzle 5 generating a variable air pressure to provide the adaptive air flow. FIG. 9 shows an arrangement for carrying out adaptive non-contact testing of a touch panel in accordance with a second embodiment of the present invention.

In the second embodiment of the present invention, similarly, an air nozzle 5 is arranged above a touch panel 100 under testing. The air nozzle 5 has a bottom forming an air jet orifice 51 opposing and spaced from a surface of an active zone 110 of the touch panel 100 by a predetermined, fixed height distance.

The air nozzle 5 is connected to an air supply source 54 through a conduit 52 and a pressure regulation unit 57. The air supply source 54 supplies air under a regulated pressure through the conduit 52 under the control of the pressure regulation unit 57 to the air nozzle 5.

The touch panel 100 is connected by a signal transmission line 15 to a testing system 6a. The testing system 6a is preloaded with programs or software for signal reading and analysis. The testing system 6a receives a touch signal from the touch panel 100 through the signal transmission line 15 and analyzes and processes the received touch signal to show data associated with the touch signal on a display device 61 of the testing system 6a.

The testing system 6a provides a pressure control signal S4 to control the operation of the pressure regulation unit 57 in order to control the air pressure supplied from the air jet orifice 51 of the air nozzle 5.

The testing system 6a also provides a movement control signal S2 to control the operation of a movement control mechanism 55 that causes the air nozzle 5 to move along a predetermined route.

Figure 10:
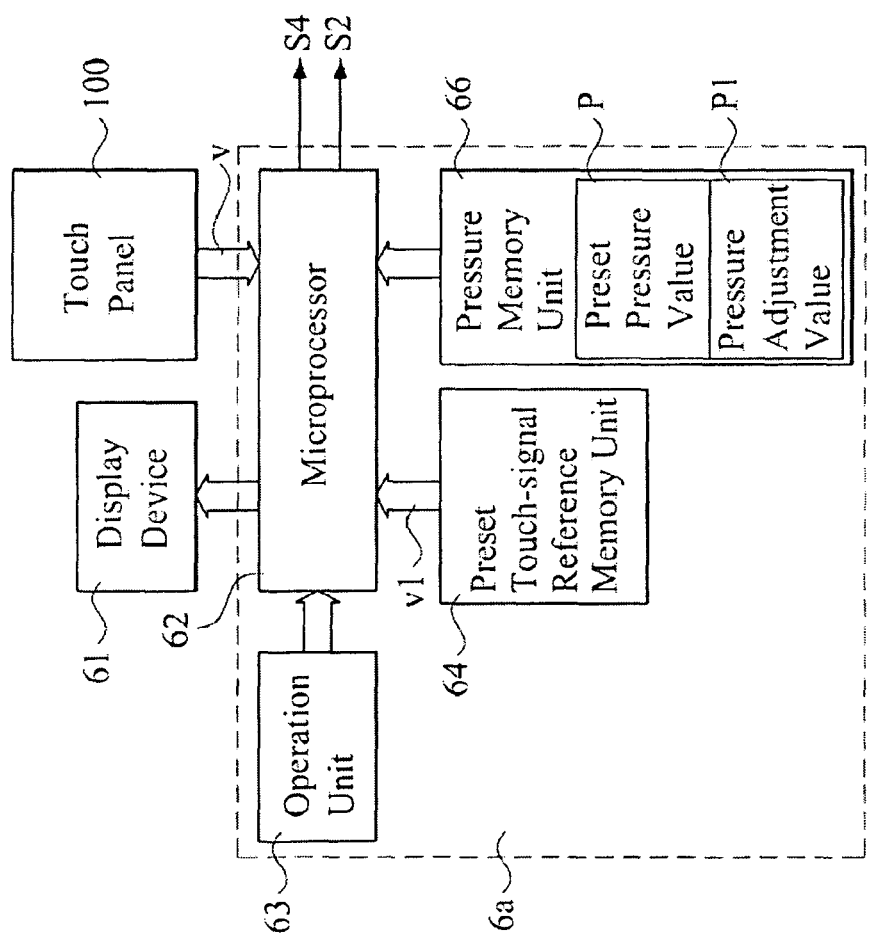
FIG. 10 is a circuit block diagram of a testing system of the arrangement illustrated in FIG. 9.

FIG. 10 shows a circuit block diagram of the testing system 6a illustrated in FIG. 9. The testing system 6a comprises a microprocessor 62, an operation unit 63, a preset touch-signal reference memory unit 64, and a pressure memory unit 66. The pressure memory unit 66 stores a preset pressure value P and a pressure adjustment value P1.

Figure 11:
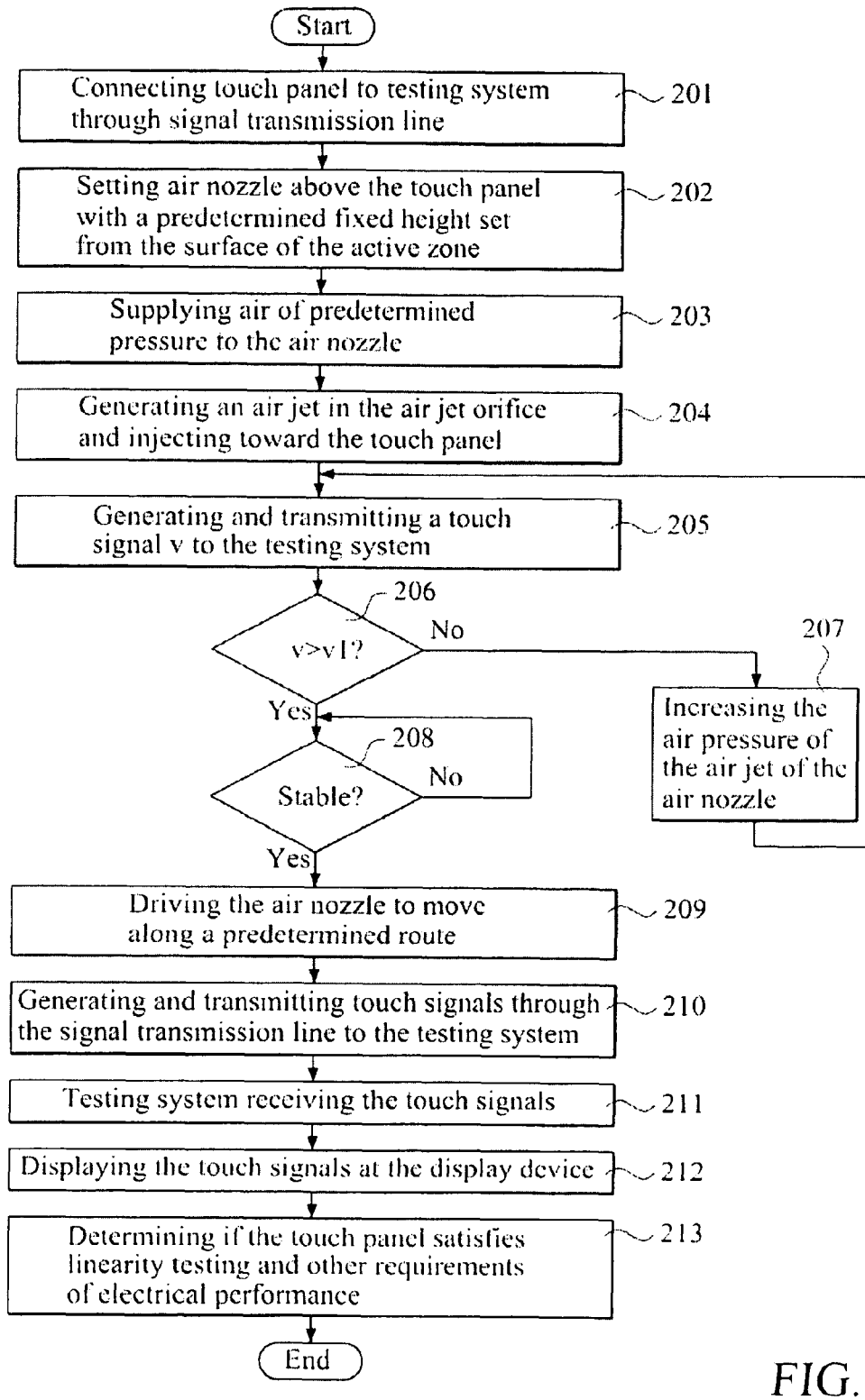
FIG. 11 is a flow chart of the adaptive non-contact testing method in accordance with the second embodiment of the present invention for testing a touch panel.

FIG. 11 shows a flow chart of an adaptive non-contact testing method in accordance with said another embodiment of the present invention for testing a touch panel. The non-contact testing method of the present invention will be described with reference to the flow chart of FIG. 5 and the arrangement of testing illustrated in FIGS. 9 and 10.

The testing starts with connection of a touch panel 100, which is manufactured in advance and is subjected to testing, to the testing system 6a through the signal transmission line 15 (step 201), followed by setting the air nozzle 5 above the touch panel 100 with a predetermined fixed height set between the air jet orifice 51 at the bottom of the air nozzle 5 and the surface of the active zone 110 of the touch panel 100 (step 202).

The air nozzle 5, the conduit 52, the pressure regulation unit 57, the air supply source 54, the movement control mechanism 55, and the testing system 6a are properly connected.

With the above pre-arrangement completely set, testing of the touch panel 100 can then be performed. Under the control of the testing system 6a, air is supplied from the air supply source 54 under a predetermined pressure P, through the pressure regulation unit 57 and the conduit 52, to the air nozzle 5 (step 203) and an air jet is generated in the air jet orifice 51 at the bottom of the air nozzle 5 in a direction toward the active zone 110 of the touch panel 100 (step 204).

In this condition, the surface of the touch panel 100 is subjected to pressurization by the air jet generated by the air jet orifice 51 that is provided at the bottom of the air nozzle 5 and thus forms a recess. The touch panel 100 thus generates a touch signal v and the testing system 6a receives the touch signal v (step 205) and compares the received touch signal v with a preset touch-signal reference level v1 (step 206).

When the received touch signal v is larger than the preset touch-signal reference level v1, it indicates that the touch signal v generated by the touch panel 100 is normal and thus, the touch panel may generate a normal touch signal when touched by a user in an actual operation of the touch panel 100.

If it is determined by step 206 that the touch signal v corresponds to zero (0) or is smaller than the preset touch-signal reference level v1, it indicates that the touch signal v generated by the touch panel 100 is not normal. Under this condition, the pressure regulation unit 57 under the control of the testing system 6a increases the air pressure of the air jet jetted from the air jet orifice 51 of the air nozzle 5 (step 207). This is done by step-by-step increasing the pressure of the air jet of the air jet orifice 51 at an increment of the pressure adjustment value P1. Then the process goes back to step 205 and the test is repeated.

After step 207, a step of determining if the pressure of the air jet from the air jet orifice 51 of the air nozzle 5 reaches an upper limit after each increment of air pressure of the air jet from the air jet orifice 51 of the air nozzle 5 may be selectively taken. In case that the pressure of the air jet from the air jet orifice 51 of the air nozzle 5 has reached the upper limit while no acceptable level of touch signal, namely a touch signal that is considered normal, is detected, then the touch panel 100 completely fails the test and is definitely considered abnormal.

Thereafter, to ensure the touch signal v provided by the touch panel 100 can be maintained and lasted for a predetermined time period, a step for determining if the touch signal v is stable (step 208) may then be performed, wherein a predetermined time period is set and when the touch panel 100 maintains the touch signal v for a period exceeding the predetermined time period, it indicates that the touch signal v is a stable signal.

A pre-test is thus completed with the above steps of adaptive testing. In this way, manufacturers of touch panels may verify if characteristics of a touch panel product satisfy the requirements by referring to the data obtained by applying different pressures to the touch panel.

Thereafter, under the control of the testing system 6a, the movement control mechanism 55 drives the air nozzle 5 to move along a predetermined route on the surface of the touch panel 100 (step 209).

In this embodiment, regulation of air pressure replaces the height control taken in the previous embodiment to similarly subject the surface of the touch panel 100 to pressurization by the air jet generated by the air jet orifice 51 at the bottom of the air nozzle 5 to form a recess, which causes the touch panel 100 to generate a series of touch signals corresponding to touch positions of the air nozzle 5 that moves along the predetermined route. The touch signals are applied through the signal transmission line 15 to the testing system 6a (step 210).

The testing system 6a receives the touch signals generated by the touch panel 100 during the movement of the air nozzle 5 along the predetermined route (step 211) and the display device 61 of the testing system 6a shows the touch signals corresponding to the movement of the air nozzle 5 along the route (step 212). Thus, a technician or an operator may base on the touch signals displayed to determine if the touch panel satisfies linearity testing and other requirements of electrical performance (step 213).

With the method in accordance with the present invention, the generation of the touch signals in the touch panel that is conventionally done with a pressurizing testing stylus moving along the touch panel can be properly simulated. Further, with the method of the present invention, data or signals representing the movement route of the air nozzle on the touch panel in association with the touch signals can be displayed on the display device of the testing system. Thus, the technician or operator may base on what are displayed to determine if a touch panel under test is qualified for linearity testing and the requirements for other electrical performance/characteristics and the technician may also identify, in a testing process, any potential flaw of the touch panel under test by setting different height distance between the air jet orifice 51 of the air nozzle 5 and the active zone 110 of the touch panel 100 and different touch-signal reference levels for different test points, as well as inspection of the stability of the touch signal generated.

In practice, the non-contact testing method in accordance with either the former embodiment or the later embodiment may be employed individually or in combination.

Although the present invention has been described with reference to the preferred embodiments thereof and the best modes for carrying out the invention, it is apparent to those skilled in the art that a variety of modifications and changes may be made without departing from the scope of the present invention which is intended to be defined by the appended claims.

What is claimed is:

1. An adaptive non-contact testing method for testing a touch panel, comprising the following steps:
   (a) arranging an air nozzle having an air jet orifice above a surface of the touch panel with a predetermined height distance set between the air jet orifice and the surface of the touch panel;
   (b) supplying an air to the air nozzle to cause the air jet orifice of the air nozzle to generate an air jet toward a selected position on the surface of the touch panel to thereby cause the touch panel to generate a touch signal;
   (c) receiving the touch signal from the touch panel;
   (d) comparing the received touch signal with a preset touch-signal reference level; and
   (e) reducing the height distance between the air jet orifice of the air nozzle and the surface of the touch panel when the received touch signal is smaller than the preset touch-signal reference level, and repeating steps (c) to (e) until the touch signal received from the touch panel exceeds the preset touch-signal reference level.

2. The adaptive non-contact testing method as claimed in claim 1, wherein after step (e), the method further comprises a step of determining if the touch signal received from the touch panel is stable.

3. The adaptive non-contact testing method as claimed in claim 1, wherein after step (e), the method further comprises the following steps:
   (f) driving the air nozzle to move along a predetermined movement route on the surface of the touch panel; and
   (g) receiving each touch signal generated by the touch panel during the movement of the air nozzle along the movement route.

4. The adaptive non-contact testing method as claimed in claim 3, wherein after step (g), the method further comprises a step of displaying the touch signal corresponding to the movement route of the air nozzle on a display device.

5. An adaptive non-contact testing method for testing a touch panel, comprising the following steps:
   (a) arranging an air nozzle having an air jet orifice above a surface of the touch panel with the air jet orifice set at a fixed height with respect to the surface of the touch panel;
   (b) supplying an air to the air nozzle to cause the air jet orifice of the air nozzle to generate an air jet of a predetermined pressure toward a selected position on the surface of the touch panel to thereby cause the touch panel to generate a touch signal;
   (c) receiving the touch signal from the touch panel;
   (d) comparing the received touch signal with a preset touch-signal reference level; and
   (e) varying the pressure of air jet generated by the air jet orifice of the air nozzle when the received touch signal is smaller than the preset touch-signal reference level, and repeating steps (c) to (e) until the touch signal received from the touch panel exceeds the preset touch-signal reference level.

6. The adaptive non-contact testing method as claimed in claim 5, wherein after step (e), the method further comprises a step of determining if the touch signal received from the touch panel is stable.

7. The adaptive non-contact testing method as claimed in claim 5, wherein after step (e), the method further comprises the following steps:
   (f) driving the air nozzle to move along a predetermined movement route on the surface of the touch panel; and
   (g) receiving each touch signal generated by the touch panel during the movement of the air nozzle along the movement route.

8. The adaptive non-contact testing method as claimed in claim 7, wherein after step (g), the method further comprises a step of displaying the touch signal corresponding to the movement route of the air nozzle on a display device.

* * * * *